(12) United States Patent
Collier

(10) Patent No.: US 8,295,035 B2
(45) Date of Patent: Oct. 23, 2012

(54) MODULAR MULTILEVEL RAISED FLOOR ELECTRO-MECHANICAL DISTRIBUTION SYSTEM

(76) Inventor: William R Collier, Esterel (CA)

(*) Notice: Subject to any disclaimer, the term of this patent is extended or adjusted under 35 U.S.C. 154(b) by 583 days.

(21) Appl. No.: 12/006,876

(22) Filed: Jan. 4, 2008

(65) Prior Publication Data

US 2011/0102974 A1    May 5, 2011

(51) Int. Cl.
*H05K 7/20* (2006.01)
(52) U.S. Cl. ........ 361/678; 361/645; 361/651; 361/692; 361/732; 361/675; 174/250; 454/186; 52/220.1; 52/263
(58) Field of Classification Search ............. 361/601, 361/645, 650, 651, 675, 676–678, 679.02, 361/692, 707, 715, 726, 728, 732
See application file for complete search history.

(56) References Cited

U.S. PATENT DOCUMENTS

| | | |
|---|---|---|
| 1,678,971 A | 7/1928 | Bergesen |
| 1,900,812 A | 3/1933 | Henkensiefken |
| 1,928,797 A | 10/1933 | Skar |
| 1,996,641 A | 4/1935 | Coleman |
| 2,278,822 A | 4/1942 | Benz |
| 2,309,451 A | 1/1943 | Hasenburger et al. |
| 2,449,292 A | 9/1948 | Gillett et al. |
| 2,867,301 A | 1/1959 | Benton |
| 2,904,991 A | 9/1959 | Vaughan et al. |
| 3,025,934 A | 3/1962 | Spiselman et al. |
| 3,251,163 A | 5/1966 | Russell |
| 3,252,400 A | 5/1966 | Madi |
| 3,316,680 A | 5/1967 | Chrastek |
| 3,363,375 A | 1/1968 | Payne |
| 3,503,166 A | 3/1970 | Nakazawa et al. |
| 3,516,347 A | 6/1970 | May |
| 3,562,978 A | 2/1971 | Ali-Oglu |
| 3,604,165 A | 9/1971 | Nailon |
| 3,628,299 A | 2/1972 | Moll et al. |
| 3,640,036 A | 2/1972 | Nakazawa et al. |
| 3,721,056 A | 3/1973 | Toan |
| 3,727,362 A | 4/1973 | Ellison et al. |
| 3,742,666 A | 7/1973 | Antoniou |
| 3,771,273 A | 11/1973 | Brodie |
| 3,789,557 A | 2/1974 | Harvey |
| 3,793,793 A | 2/1974 | Dobbins |
| 3,827,203 A | 8/1974 | Berrie ............... 52/263 |
| 3,835,614 A | 9/1974 | Downing |
| 3,852,928 A | 12/1974 | Raith |
| 3,862,350 A | 1/1975 | Milosavich |
| 3,893,271 A | 7/1975 | Kotlarz |

(Continued)

OTHER PUBLICATIONS

Intel White Paper—Air Cooled High-Performance Data Centers: Case Studies and Best Methods Nov. 2006 1106/ARM/RDA/PDF Order No. 315513-001 US.

*Primary Examiner* — Courtney Smith
(74) *Attorney, Agent, or Firm* — Banner & Witcoff Ltd

(57) ABSTRACT

The subject invention is directed to an improved modular multilevel raised floor electro-mechanical distribution system for installation in building structures including, but not limited to, data centers and similar rooms having high heat loads requiring usually dedicated cooling systems and usually having extensive data cabling and wiring. In addition to a walking and equipment support surface, the invention provides dedicated levels, isolated from one another and positioned under the walking surface, for distribution of electrical services, including data, on the one hand, and conditioned air, on the other.

9 Claims, 8 Drawing Sheets

U.S. PATENT DOCUMENTS

| | | |
|---|---|---|
| 3,903,667 A | 9/1975 | Zetlin |
| 3,921,348 A | 11/1975 | Kurzen |
| 3,924,370 A | 12/1975 | Cauceglia et al. |
| 4,016,357 A | 4/1977 | Abrahamsen .................... 174/48 |
| 4,034,526 A | 7/1977 | Deslaugiers |
| 4,085,557 A | 4/1978 | Tharp |
| 4,209,660 A | 6/1980 | Flachbarth et al. ............. 174/48 |
| 4,274,458 A | 6/1981 | Schwartzkopf et al. ...... 104/124 |
| 4,296,574 A | 10/1981 | Stephens |
| 4,450,658 A | 5/1984 | Legeai ......................... 52/126.3 |
| 4,465,288 A | 8/1984 | Kofoed ........................... 52/221 |
| 4,508,162 A | 4/1985 | Radtke |
| 4,630,417 A | 12/1986 | Collier |
| RE33,220 E * | 5/1990 | Collier ............................ 52/263 |
| 5,468,184 A * | 11/1995 | Collier .......................... 454/186 |
| 5,477,649 A * | 12/1995 | Bessert ........................... 52/263 |
| 5,546,717 A * | 8/1996 | Penczak et al. .............. 52/220.5 |
| 6,308,477 B1 * | 10/2001 | Santamaria .................. 52/220.1 |
| 6,508,037 B1 * | 1/2003 | Owen .......................... 52/220.1 |
| 6,550,195 B1 * | 4/2003 | Cooper et al. ............... 52/220.3 |
| 6,637,161 B1 * | 10/2003 | Buchalter et al. ............ 52/126.6 |
| 6,672,022 B2 * | 1/2004 | Simmons ........................ 52/263 |
| 6,857,230 B2 * | 2/2005 | Owen .......................... 52/126.6 |
| 7,770,344 B2 * | 8/2010 | Betz .............................. 52/263 |

\* cited by examiner

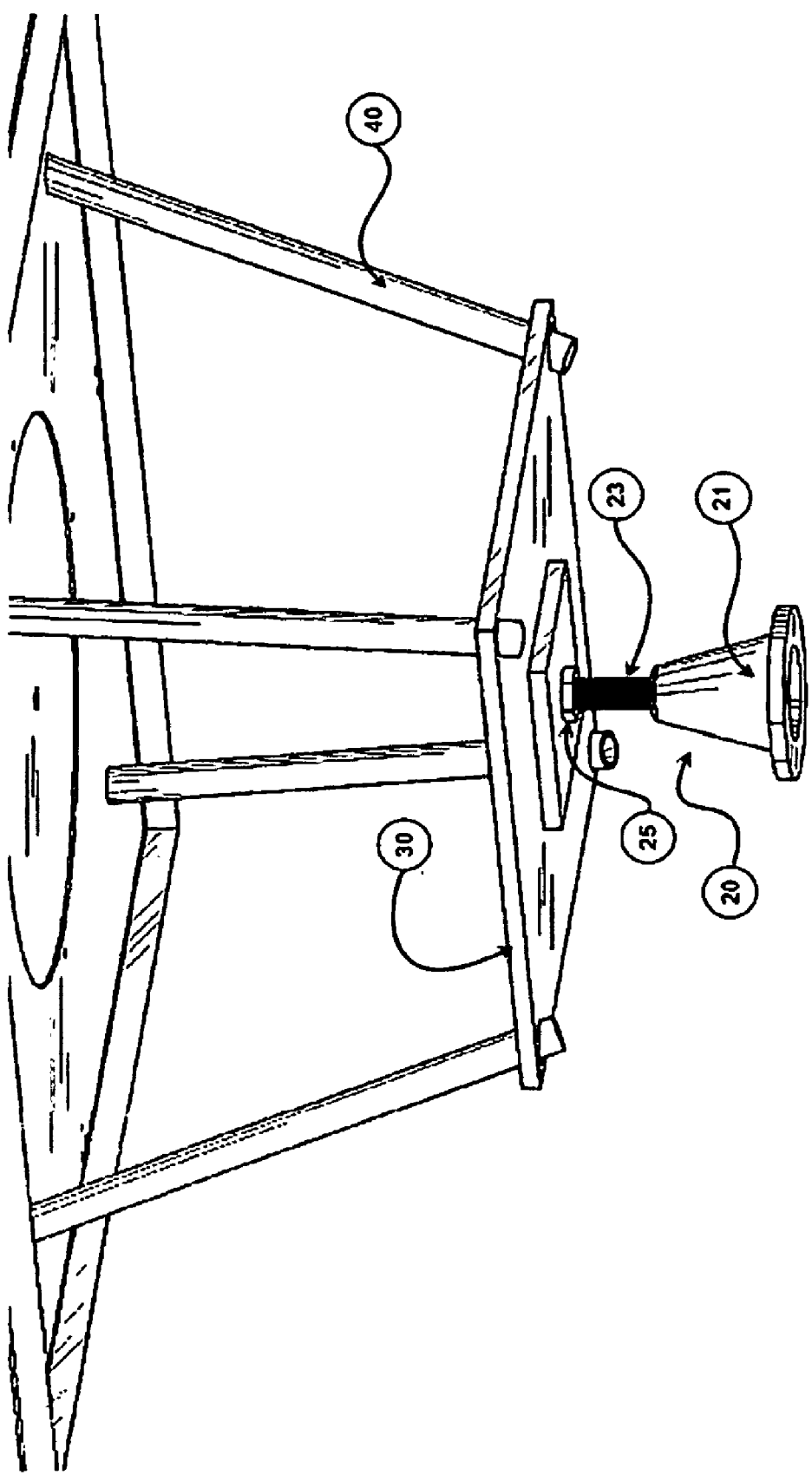

MODULAR MULTILEVEL RAISED FLOOR ELECTRO-MECHANICAL DISTRIBUTION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPONENT DISK APPENDIX

Not Applicable

BACKGROUND OF THE INVENTION

The subject invention is directed to an improved modular multilevel raised floor electro-mechanical distribution system for installation in building structures including, but not limited to, data centers and similar rooms having high heat loads requiring usually dedicated cooling systems and usually having extensive data cabling and wiring. In addition to a walking and equipment support surface, the invention provides dedicated levels, isolated from one another and positioned under the walking surface, for distribution of electrical services, including data, on the one hand, and conditioned air, on the other. As is discussed further below, the present invention represents a significant advance over the inventor's pioneering "Modular Combination Floor Support and Electrical Isolation System for Use in Building Structures," which was described and claimed in Reissue Pat. No. 33,220, and which was made the subject of the successful broadening reissue application during the inventor's litigation for willful patent infringement, Collier, et al. v. Airtex, Inc., et al., 87 C 4097 (N.D. Ill. 1990), aff'd, 968 F2d 1227 (Fed. Cir. 1992), in which the inventor prevailed on all counts against the defendants. The title "Modular Multilevel Raised Floor Electro-Mechanical Distribution System" is used herein to refer to the invention because it more accurately reflects the invention's multiple functions than does the term used in the RE 33,220 patent. In the discussion that follows, the invention will sometimes be referred to as "the system."

Turning now to the specific problems that are either ineffectively addressed by—or are in fact caused by—the prior art, and to which the present invention is directed, it is to be noted that there is a universal, long-felt need among the designers of data centers and similar facilities for an effective, efficient, system for delivering and managing conditioned air and electrical services in such rooms. Energy efficient, uniform, and dependable distribution of air conditioning has become especially important given the fact that in just the past 10 years the average data center heat load has risen from approximately 20 to 40 watts per square foot to between 80 and 120 watts per square foot Of course, over the same period, the cost of electricity has skyrocketed and its availability in some regions has become less dependable. It is generally recognized by energy experts that the electricity required for data center operations just in the United States is equal to the output of twelve average size power plants. Put another way, it is estimated that data centers consume 1.5% of all the electrical power consumed nationally, and that 45% of this electricity is used to generate data center cooling. Put another way, it is estimated that data centers consume 1.5% of the total U.S. electricity consumption (61 Billion kWh in 2006), "EPA Report to Congress on Server and Data Center Energy Efficiency," p. 4, Aug. 2, 2007. Moreover the U.S. consumption is only 40% of the worlds data center consumption, as stated in "Estimating Regional Power Consumption Servers: A Technical Note," by Jonathan G. Koomey, Ph.D. Project Scientist, Lawrence Berkeley National Laboratory. p. 1. 45% of this electricity is used to generate data center cooling. See also, The Green Grid, "Guidelines for Energy Efficient Data Centers," p. 3, FIG. 1, Feb. 16, 2007.

And, as difficult to believe as it may be, credible current estimates are that the average data center heat load may rise to between 400 and 500 watts per square foot in the next three to five years! This is likely to occur even if progress is made in developing computer equipment that generates less heat, because of the widely expressed goal of engineers, for both security and economic reasons, of reducing significantly the typical data center footprint while at the same time increasing greatly the density of the computer equipment housed within the space.

Of course, in data center and similar high-heat environments, air conditioning is not a mere luxury that can be skimped on or dispensed with. Overheated computers and other electronic equipment can result in system wide failure, permanent data loss, and extensive hardware damage.

Yet, except where the inventor's original invention is being used, the method for distributing air conditioning and electrical conductors in data centers and similar facilities remains the same as it has for over 40 years, namely, routing the disparate electrical and mechanical services through the undifferentiated space under the conventional raised access floors so familiar to those skilled in the art. Such single-level raised access floors comprise a grid work of pedestals positioned on a building floor, the tops of which pedestals support the corners of access floor panels. These panels are usually square and measure approximately 24"×24", or a close metric equivalent, and are positioned next to one another on the pedestal grid using a gravity fit. "Cable cut-outs" are made in various panels to permit the passage of electrical conductors from the space under the access floor to equipment sitting on it. Perforated access floor panels are provided to permit, at least theoretically, conditioned air to enter the space above the floor for purposes of cooling computer and associated equipment. To add required stability to the single-level access floor structure, stringers often to tie the pedestal heads together. The inherent problems the conventional raised access floors create for air distribution, cabling and wiring management, and room reconfiguration are present right from the moment facility operations begin and become progressively worse as time goes on.

With respect to conditioned air distribution, blowing chilled air under a single-cavity raised floor is an extremely inefficient way of delivering essential cooling to the computer equipment sitting on the floor surface. Even when oversize package down-flow air handling units are used, or "extra" units are added to the data center plan, air distribution is inadequate. It is often claimed that adding air conditioning capacity far in excess of what should actually be needed to meet a data center's heat load is wise because it provides back-up or "redundant" coverage in case one of the other package units fails. This alleged protection, however, is illusory.

To understand why, one must first understand that under floor air distribution in a typically designed data center is wholly dependent on the "throw distance" achievable by an down-flow unit's fan. Under ideal conditions, which virtually never exist as is explained further below, a down-flow air conditioner can throw the conditioned air it generates a distance of about 30 feet in a pie-slice shaped pattern under a raised floor. The force generated by the fan is supposed to push the cool air under the floor and up through the single level raised floor's perforated panels to cool the directly adjacent computer equipment.

Valuable interior room space must be dedicated to the placement of the down-flow air handlers in order to provide the theoretical room area coverage. This is because there can be no effective pressurization of the under floor space, as is explained further below. Even under ideal conditions, if a unit fails the region that is supposed to be cooled by it will quickly become starved for conditioned air unless there is a so-called "redundant" down-flow air handler sitting right next to it. This will rarely, if ever, be the case because as anyone familiar with data center operations knows, all of the air conditioners, including the supposedly redundant one, are spaced apart from each other in order to achieve the best room area coverage possible under the circumstances. The reality is that any supposedly "backup" or "redundant" unit is switched on and used continuously along with the rest of the room's air conditioners.

Room designers know that the package down-flow air handlers will not provide the theoretical 30 foot throw distance under practical working conditions. For one thing, " . . . 25% of the air flow in the raised floor passes through cable cutouts, cracks between the [access floor] panels and other leakage areas. See, Liebert Corporation, "Installation Manual, Liebert Deluxe System/3™—Chilled Water, 50 and 60 Hz, 2-60 Ton CW Systems (FH/VH)," p. 18, copyright 2006. Other such "leakage areas," which are often far from where conditioned, moving air is needed to cool equipment, include the large openings that are created whenever floor panels are removed so that cables, wires, and chilled-water pipes under the floor can be accessed.

In addition, the movement of conditioned air is thwarted by the blockages created by these cables, wires, wire-ways, and piping. Frequently, old, unused cables and wire-ways are not removed from under a conventional raised floor. Among the reasons for this are that removing too many floor panels, and the associated stringers where they are present, compromises a conventional raised floor's stability. Moreover, data center managers know that lifting panels in order to remove old conductors and wire ways exacerbates the already serious airflow problem by permitting the escape of conditioned air. In addition, it is uncomfortable to work in the dirty, drafty, and cold under-floor environment where the electrical conductors are often several feet below the surface of the walking surface—at least at first. In its worst, but all-too-common, manifestation the under floor congestion eventually results in cables, most of which are no longer in use, actually pushing raised floor panels off of their support pedestals.

The blockages stop conditioned air from going where it is supposed to, which often causes the package air handling units to "short circuit." This means that instead of traveling to equipment and carrying away heat, the conditioned air discharged by an air conditioner's supply side is immediately sucked back into the unit's return side. As explained by Intel, "[w]hen we started measuring data center heat densities, we were amazed to discover how inefficient our cooling methods were. Our computer rooms air conditioning (CRAC) units were moving huge quantities of air, yet their cooling coils were only providing 10 to 25 percent of their rated capacity. There were localized hot spots within the data center and some servers were ineffectively drawing in hot air from the hot aisles. Other areas were very cold, with most of the air bypassing the hot equipment and short circuiting right back to the CRAC units." Intel Information Technology, White Paper, Air-Cooled High-Performance Data Centers: Case Studies and Best Methods, November 2006, p. 4.

The fact is that the air distribution balance is so poor in many facilities that hot air from the room is drawn downward by the Venturi effect through some of the very perforated panels that are supposed to be delivering cool air. It is the combination of leaks and blockages that makes it impossible to pressurize the under floor space so as to provide adequate, uniform, and predictable air delivery.

Yet another dysfunctional feature that hinders effective air conditioning and wastes energy in data centers using package down-flow units is "duty cycling." While some of the units are in cooling mode others are in heating mode to provide the proper humidity for the room. This means that the units often operate at cross purposes to one another.

To cope with the universal problem that the data center industry calls "hot spots," i.e., severely overheated equipment areas, data center operators are reduced to using large pedestal fans and movable spot coolers, which consume additional electricity, take up space, and add their own heat to the room that needs cooling. Hot spots exist in data centers having conventional raised access floors even when air conditioning capacity is far in excess of what should be required to address a room's heat load. There can also be "cold spots," which can also affect computer equipment functioning, and certainly constitute a waste of energy. The situation is primitive, costly, and dangerous.

The existence of these problems is not a matter of serious dispute and data center energy consumption and waste, including the energy used to generate air conditioning, have been a major focus of both government and private industry concern. Thinking and building "Green" have become the watchwords of the data center industry.

It is not surprising, therefore, that various means have been proposed for coping with the energy waste and other problems associated with data center air conditioning. For example, a number of manufacturers have begun to offer special equipment enclosure cabinets having chilled water pipes in them to cool the enclosed equipment. These cabinets can cost upwards of $30,000 a piece. It becomes quite apparent that this is a costly solution indeed, when one considers the fact that a moderately sized data center may house as many as several hundred equipment cabinets.

The Intel document sited above suggests a number of different attempts to solve the problems with cooling equipment in data centers. One such recommendation is to construct a two-story data center that has the air conditioning and other equipment in the lower story and the equipment in the upper story with the air being fed through the floor slab. A second recommendation is to build passive chimney cabinets from the raised floor to the ceiling to try and contain the air so it can't short circuit. Another recommendation is to build a room without a raised floor and bring all the supply air to the cold aisles through metal ductwork, yet another recommendation is to use a combination of the passive chimney cabinets with wall supplied air handling units that feed the air under a raised floor and return the warm air through a ceiling plenum.

The ASHRAE Journal, December 2007, p. 41 suggests a High-density Heat Containment System Architecture, It uses a rack enclosure concept, and a physical barrier to contain the IT equipment heat and provide a predictable pathway for the heat to return to the data center cooling system. This was actually done at Oracle in 2004, they have large flexible ducts extending from the top of the equipment cabinets to the return ceiling plenum.

Although the present invention does not preclude the use of at least some of these prior art approaches to curing the deficiencies of standard access floor conditioned air distribution, e.g., water-cooled equipment cabinets, and the ORACLE heat containment method, for the reasons discussed below it is believed that it will render them generally unnecessary.

BRIEF SUMMARY OF THE INVENTION

By providing dedicated service levels that are substantially coextensive in area with the equipment support and walking floor surface above them, the present invention significantly facilitates cable and wire management, and remarkably improves the effectiveness of conditioned air delivery in the data center space, thereby protecting expensive computer equipment and saving energy.

In the two-level expression of the invention illustrated herein, the conditioned air distribution level, also referred to as the conditioned air plenum or air distribution plenum, and the electrical services level are separated from one another by an array of metal panels or "pans" arranged so as to provide an electrical conductor support floor, which is spaced beneath and apart from the walking floor panels, or access floor panels. Each metal pan has substantially the same area as a walking floor panel and the metal pans are supported by the same base members and floor support struts that support the access floor panels. In addition to the conductor support floor, isolation between the air distribution level and the electrical services level is achieved by a metal barrier surrounding the perimeter of the electrical services level and by air ducts, sometimes referred to as "air chimneys" that channel cool air from the conditioned air plenum, through the electrical services level, and into the work space above the walking floor surface.

Turning first to the subject of electrical services, the invention permits ready access to wires and cables simply by removing walking floor panels. Stringers are never needed because of the marked structural stability imparted by the conductor support floor and other aspects of the system's inventive design. Work on electrical conductors always takes place in the ambient room environment because the conditioned air is kept isolated from the electrical services level.

As many walking floor panels as desired can be removed without comprising the system's structural integrity or permitting the escape of conditioned air. Plenum rated cables are not required because cabling and wiring are isolated from the conditioned air stream. Electrical connections to computer or other equipment in the room can be made using typical cable cut-outs in the walking floor panels. The difference from conventional construction is that with the present invention conditioned air will not escape through the cut-outs and gaps between the walking floor panels. Also, dirt will not fall into the conditioned air stream through these cut-outs and gaps.

In addition, the metal pans that form the conductor support provide an inherent "electrical reference plane," greatly reducing, in comparison to conventional raised floors, the number of grounding connections that must be made. Any need for expensive "electrical reference grid" products is eliminated as well.

Turning now to the subject of air delivery, the invention provides highly effective, uniform air distribution through a truly pressured, dedicated conditioned air plenum. This ventilation effectiveness not only results in the elimination of hot spots, cold spots, and other air distribution anomalies such as the above explained short cycling and migration of hot air into the under floor space, but also markedly improves energy efficiency by making it possible to much more closely match the tonnage of installed cooling capacity to the room's heat load. Package down-flow air conditioning units are located on one of the room's perimeters and conditioned air is discharged into the full height perimeter portion of the air plenum, from where the air passes under pressure into the single level portion of the plenum. This pressurization means that it is unnecessary to scatter air conditioners throughout the interior space. Air distribution is not dependant on the "fan throw" discussed above. This saves valuable interior space. Moreover, the number of units installed can often be reduced, and true N+1 redundancy, i.e., emergency back up for the entire space, can be supplied by a single unit. Packaged down-flow units do not have to be moved when computer equipment is relocated.

In fact, the invention frees the data center from the need for inefficient, floor-space hogging package down-flow units altogether. Because the system's air plenum fosters true pressurization and can take advantage of static regain, central station air conditioning systems located outside the room can be used to discharge conditioned air into the perimeter portion of the air plenum, sometimes referred as the "pressurized" or "perimeter air trough."

Central station system are less expensive and far more energy efficient than down-flow air handlers. Their cooling coils can be more closely matched to a room's sensible heat load, and they eliminate or greatly reduce the duplication of fan motors and chilled water pipes that necessarily exists when multiple down-flow units are used. Use of central station air conditioning in conjunction with the invention means that no data center space need be occupied by air handlers, maintenance is reduced through the reduction in the number of fan motors and other breakable components, and any maintenance that is required takes place outside the secure data center environment. No chilled water pipes are required in the data center when central station air conditioning is used, and so the danger of water flooding the under floor space is eliminated. Also, as is the case when package down-flow units are used in conjunction with the invention, N+1 redundancy can be supplied by a single back-up unit.

Compared to conventional raised access floors, the inventive system's ventilation effectiveness can save from 24% to 66% of the energy used to generate data center air conditioning, depending on whether package down-flow units or central station air handlers are used.

The benefits provided by the present invention over conventional raised access floors are the same as those generally available from the inventor's prior invention that is the subject of the RE 33,220 patent. The improvements described and claimed herein inventively distinguish the present invention over the inventor's prior system, as is detailed immediately below.

Turning first to a brief description of the inventor's prior invention, for many practical reasons that affect the development of a new construction industry product, it comprised numerous components that were modified from the parts and pieces of conventional raised access floors. The prior system certainly worked, but when its numerous benefits and potential benefits were fully appreciated, the inventor developed inventive improvements aimed at: 1) maximizing those benefits; 2) reducing installation time and costs; 3) enhancing ease of maintenance; 4) increasing operational dependability; and, 5) improving structural stability.

The original motivation behind the prior invention was to overcome the practical problems that the Chicago Building Code and similar codes posed for data center operators when it came to accessing wires and cables housed in the space under a conventional raised access floor. Chicago's stringent Code required complete isolation of line voltage wires, data cables, and conditioned air from one another. With a conventional raised access floor this was accomplished by using rigid conduits and covered cable troughs that are virtually impossible to reconfigure because of their own inflexibility, and because of the above explained problems associated with removing walking floor panels from a conventional raised floor.

The original invention elegantly solved these problems using the multilevel approach in a single, integrated system. Not surprisingly, however, as revolutionary as it was the prior multilevel system bore a strong resemblance to conventional raised access floors in terms of componentry and configuration.

Of course, new parts had to be developed, but the former system used many pieces, often with modifications, that were available to the raised access floor industry. By way of example, the metal panels used to create the level(s) under the access floor panels were held in place by stringers that were a modified version of the stringers used at the pedestal head level in many conventional raised access floors to support the edges of the access floor panels. The tabs that supported the stringers on the floor pedestals' midsections corresponded to the portions of the pedestal heads that supported the stringers in conventional raised access floors. Also, in contrast to the present invention, the structure of the former invention was built on a floor pedestal grid configured virtually identically to the grids used in conventional raised access floors.

The present invention departs from both conventional raised access floors and the structure of inventor's prior invention in order to provide the optimum multilevel raised floor electro-mechanical distribution system. Perhaps most important from the practical installation and maintenance perspective, because of the inventive improvements the present invention requires far fewer separate parts than did the original multilevel floor. In the preferred embodiment described herein, the number of parts that must be installed in the field has been reduced to 2.5 parts per module from the 8.5 parts that were required to be field installed in the prior system. Inventive improvements have made it possible to eliminate "left" and "right" corner pieces, and the hold-down "brackets, clamp units, and pins" disclosed in the RE 33,200 patent. In addition, the present inventive design has reduced the number of joints by more than 50% which, among other things, eliminates the need to supply gaskets in the field, and greatly reduces points of potential air leakage.

Stringers have been rendered unnecessary in the present invention, in contrast to the structure disclosed in the RE 33,220 patent. The fact that stringers do not have to be positioned on floor pedestals and then have the edges of metal conductor support floor pans set in them represents a substantial savings in installation work and an improvement over what is shown in the inventor's prior patent.

The inventive support base configuration of the present invention greatly improves ease of installation as compared to the prior system. This improvement also increases both the system's seismic stability and loading capacity as compared to the previous invention.

The above discussion summarizing some of the inventive improvements of the present invention compared to the inventor's former invention is merely illustrative and is not intended to be exhaustive or limiting. Given the problems inherent with conventional raised access floor systems and the serious environmental and economic problems caused by energy waste, it is an object of the invention to provide an integrated electro-mechanical distribution system with improved air distribution performance such that the air cooling capacity installed in the data center can be far more closely matched to the data center's heat load than is possible when using conventional raised floors.

BRIEF DESCRIPTION OF THE SEVERAL VIEWS OF THE DRAWINGS

FIG. 5 is a perspective view showing the panel support assembly installed on the base assembly.

DETAILED DESCRIPTION OF THE INVENTION

Figure 1:
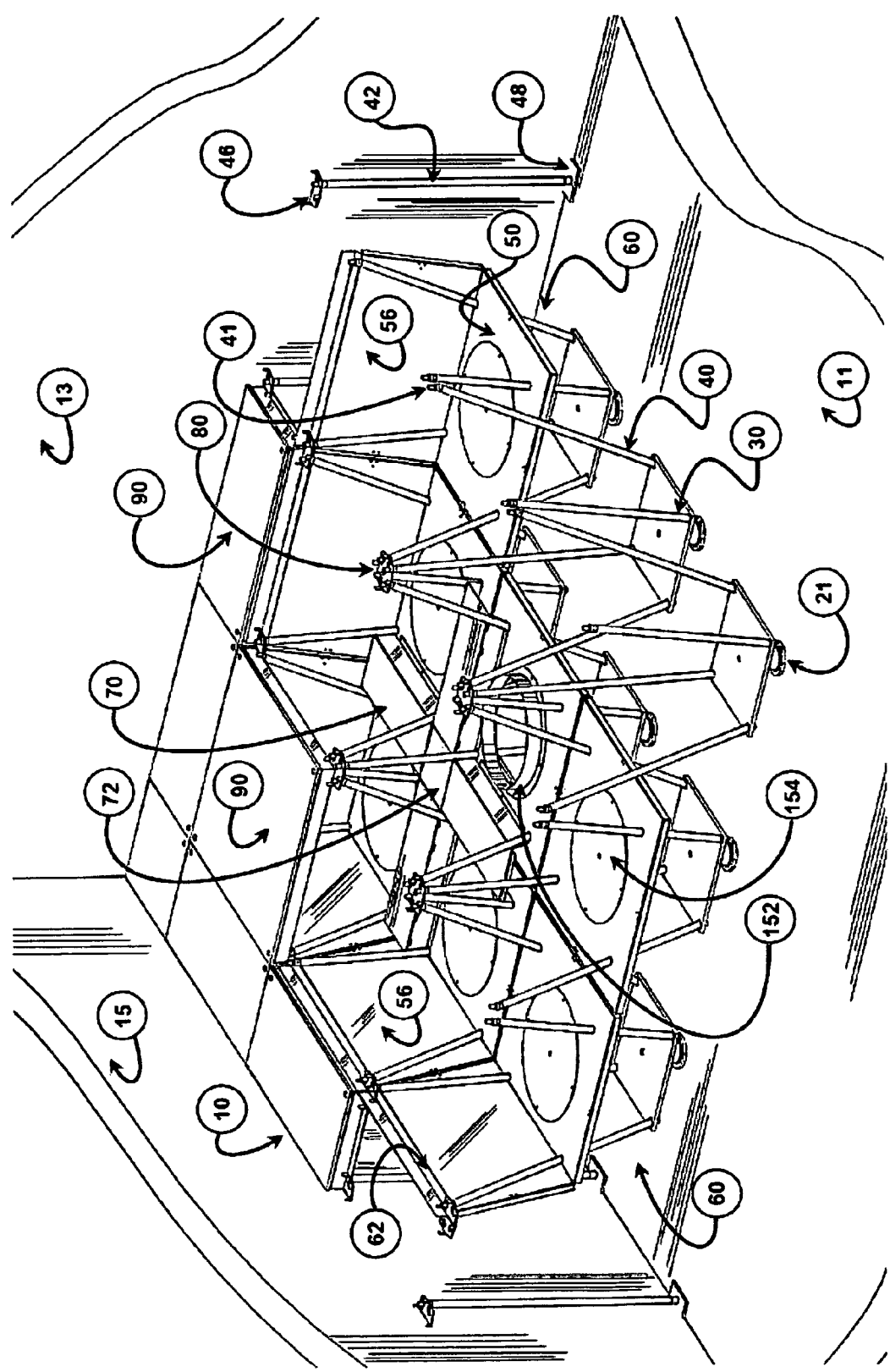
FIG. 1 is a perspective view, in part diagrammatic in character, with portions cut away and certain parts removed for illustrative purposes and showing portions of the conditioned air and electrical services levels of the invention installed in position of use.

While it will be understood that the concept of the invention is applicable to a number of installations, and that constructional details of it may be varied, a description of the preferred form of the invention will be given wherein there are provided Referring now to the drawings in greater detail, there is shown in FIG. 1 a portion of a two-level modular electro-mechanical distribution system embodying the invention, generally designated 10, installed on a building floor 11 in a closed room area 15 defined in part by the building floor and the vertically extending building walls 13. Base assemblies, of which only the bell-shaped foot member 21 is partially visible here, are positioned on the building floor 11 and receive and retain panel support assemblies which comprise strut plates 30 and panel support struts 40 which are retained on the strut plates and extend vertically upward at an oblique angle to the center of the strut plate 30 on which they are retained.

The upper portions of the panel support struts pass through portions of metal conductor support floor panels 50 which are retained and supported on intermediate portions of the panel support struts 40. In the preferred embodiment disclosed here, each support floor panel 50 is provided with a duct opening 152 and with a removable and re-installable duct opening cover 154. Perimeter closures 56, which have a conductor support floor portion and a portion that extends vertically from the conductor support floor portion are used at the system's perimeter in lieu of conductor support panels 50. Although not required by the invention, the preferred embodiment described here shows the vertical portion of the perimeter closures 56 as extending at an oblique angle from their associated conductor support floor portions. This is the preferred configuration because it facilitates smoother air flow. Also, in the preferred embodiment, the perimeter closure 56 is one piece, which eliminates a potential source of conditioned air leakage from the conditioned air level 60 into the electrical services level 62.

Figure 2:
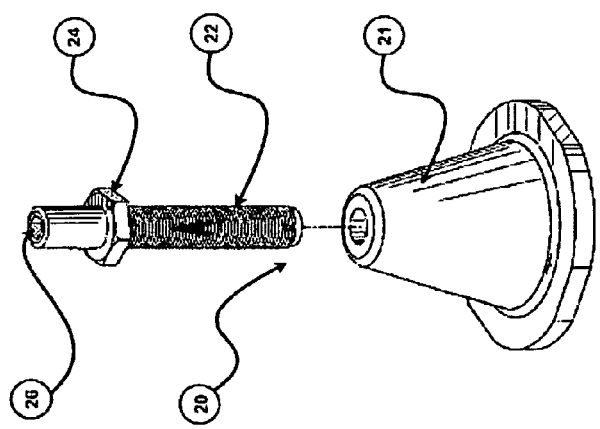
FIG. 2 is an perspective view that has been exploded and which shows the base assembly.

The base members referred to above and shown more completely in FIG. 2 space the structure above them apart from the building floor 11. The space between the building floor and the bottom of the conductor support floor created by the conductor support floor panels 50 comprises what is referred to as the single level portion of the isolated air plenum 60. The space between the building wall 13 and the exterior sides of the vertically extending portions of the perimeter closures 56 comprises the perimeter plenum portion of the air plenum 60.

Perimeter pedestals 42 are placed against the building wall. Each perimeter pedestal is provided with a foot 48 adapted to be received on the building floor 11 and with a pedestal head 46 adapted to receive and support a portion of an access floor panel 90. The upper ends of the panel support struts 40 are provided with access floor panel positioning and retaining assemblies 41. These assemblies 41 are adapted to receive and retain locking plates 80, which in turn seat and help position portions of raised floor access panels 90.

Many forms of optional modular wire ways can be installed in the electrical services level 62 which is defined by the upper surface of the conductor support floor panels 50 and interior sides of the perimeter closures 56. Wire way 70 is one such form shown here. As depicted, the wire way 70 is provided with removable covers 72 so as to permit access to the electrical conductors housed within. Any electrical conductors not housed in the wire way may simply be laid in the electrical services level Turning now to the other drawings, certain constituents of the structure of the invention are shown in greater detail. FIG. 2 illustrates the base assembly 20 of the preferred embodiment comprising a bell-shaped foot member 21 adapted to receive an adjustable threaded leveling leg and retaining stud 22 which extends axially outwardly from the top the bell-shaped foot member 21. The upper portion of the leveling leg and retaining stud is provided with a flange or collar 24. The top of the leveling leg and retaining stud 22 is provided with a hex socket 26, which permits a module of the invention to be height adjusted from above, as is explained in further detail below.

Figure 3:
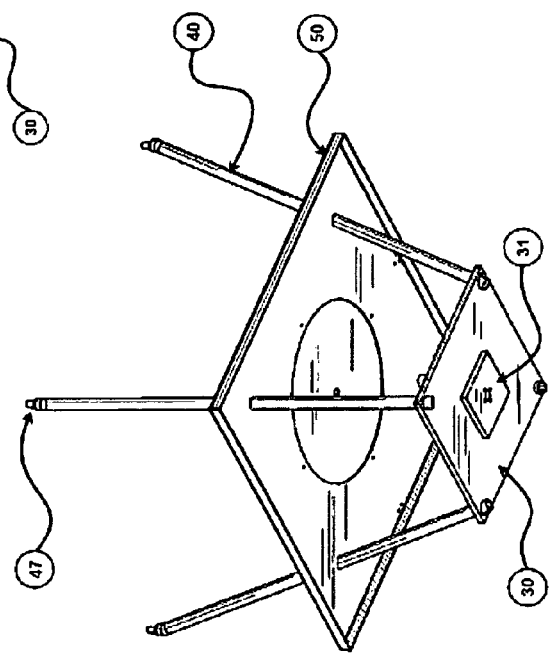
FIG. 3 is a perspective view showing the panel support assembly supporting a conductor support floor panel.

Referring now to FIG. 3, it illustrates the panel support assembly comprising the strut plate 30 and a plurality of panel support struts 40 attached thereto. In the preferred embodiment shown here there are four panel support struts retained on the strut plate, but the invention contemplates that a configuration could be adopted wherein a different number of support struts could be used. Also illustrated is a conductor support floor panel 50 positioned on and supported by the panel support struts. In the preferred embodiment the conductor support floor panels 50 are installed on the panel support strut members 40 during the manufacturing process. Strut plate 30 is provided with a center hole 31 adapted to permit entry of the upper portion of the leveling leg and retaining stud 23 and sized so that the strut plate will seat on the collar 25 of the leveling leg and retaining stud 23.

Figure 4:
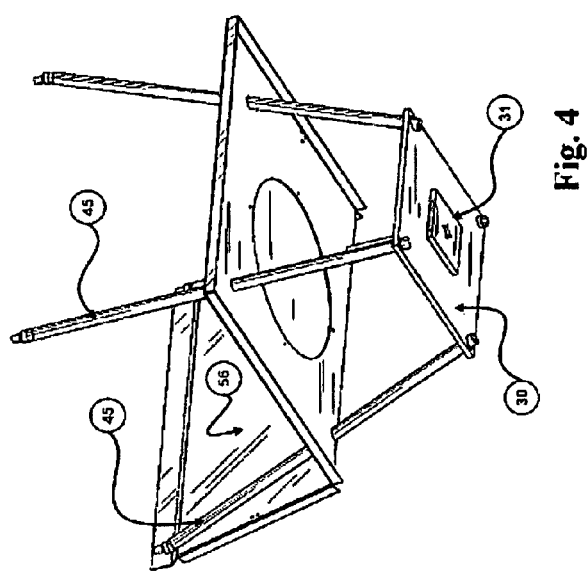
FIG. 4 is a perspective view showing a perimeter closure installed on a panel support assembly.

FIG. 4 is similar to FIG. 3, except that it shows a perimeter closure 56 installed on a panel support assembly rather than a conductor support floor pan. The configuration of the substantially vertical portion of the perimeter closure 56, viz., extending upwardly at an oblique angle from the plane of the conductor support floor portion, accommodates the similar angle of the panel support struts that help retain it.

Turning to FIG. 5, it shows the panel support assembly comprising the strut plate 30 and the panel support struts 40 installed and seated on the collar 24 of the base assembly. In the preferred embodiment, the panel support struts 40 are welded to the strut plate 30 during the manufacturing process and the structure shown in FIG. 3 is placed as a unit on the base assembly in the field.

Figure 7:
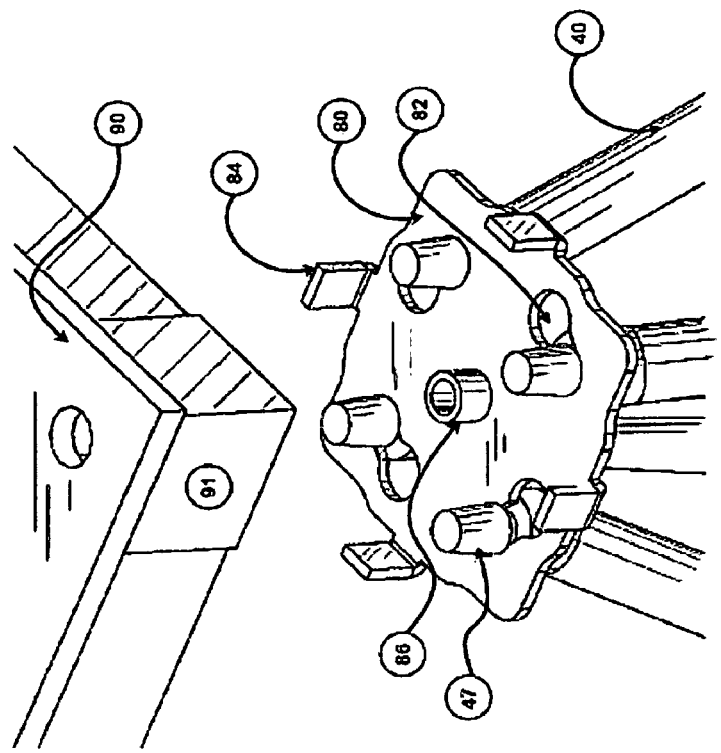
FIG. 7 is a perspective view of a locking plate engaged by the lugs of four access panel positioning and retaining assemblies, and a portion of a positioned and retained access floor panel.
Figure 6:
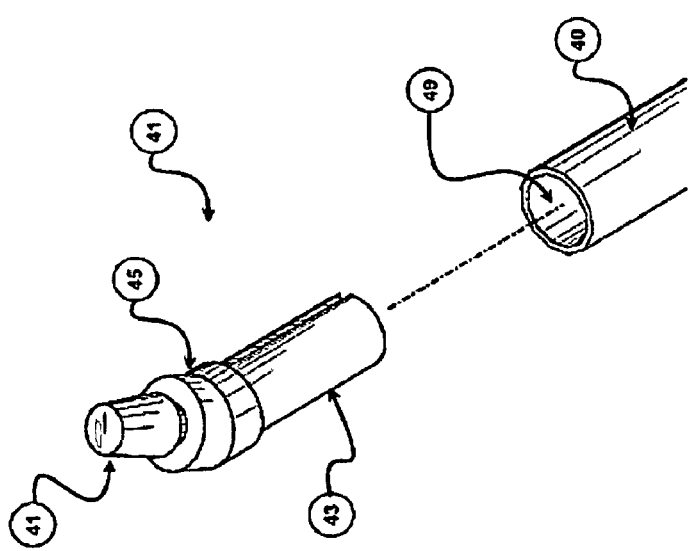
FIG. 6 an exploded perspective view showing a access floor panel positioning and retaining assembly in position for installation on a panel support strut.

FIGS. 6 and 7 show details of the means for seating and retaining portions of the walking floor panels positioned over the conditioned air and electrical services levels of the invention. FIG. 6 illustrates that the panel support strut 40 of the preferred embodiment comprises a round tube having an opening in its top portion. An access floor panel positioning and retaining assembly 41 having an insert portion 43 of a lesser outer diameter than the interior diameter of the tube of the panel support strut 40, extends downwardly into the tube until the angled aspect of the upper portion of the access floor panel positioning and retaining assembly 41 and the flange 45 provided on its upper portion arrest further downward travel. When retained in the panel support strut 40 the upwardly extending lug 47 projects out from and above the panel support strut 40.

In FIG. 7, the locking plate 80 is showed installed over the lugs 47 of the access floor panel positioning and retaining assemblies 41 of four cooperating panel support struts 40. The locking plate is provided with four generally key-slot shaped holes 82. The larger diameter side of each key-slot shaped hole 82 permits the upwardly extending lugs 47 to pass through the holes. Once the locking plate 80 has been installed over the lugs 47, it is adjusted so that the smaller diameter side of the holes key-slot shaped holes 82 are captured under the bottom lip of the lug 47 such that the locking plate 82 is captively held in place. A portion of an access floor panel 90 is illustrated having one of its corner portions 91 seated on the locking plate 80 and being positioned and retained thereon by a lug 47 of a floor panel positioning and retaining assembly 41, two upwardly extending ears 84 provided on the locking plate 80, and a round tab 86 extending upwardly from the center of the locking plate 80.

Figure 9:
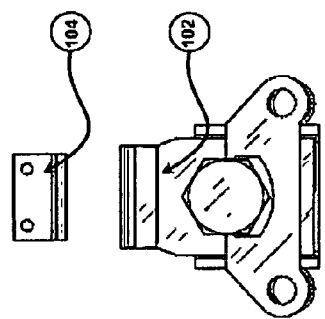
FIG. 9 is a perspective view showing, respectively, the latch and the catch of the latching mechanism.
Figure 8:
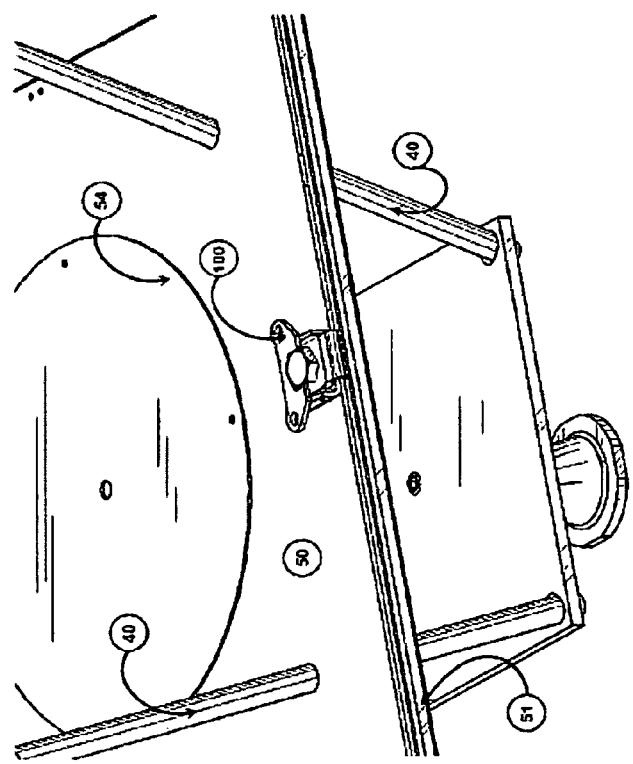
FIG. 8 is a perspective view of a latching mechanism positioned on conductor support floor panels and drawing together their common edges.
Figure 10:
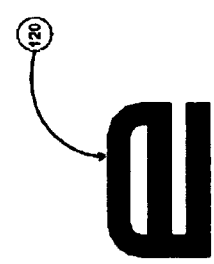
FIG. 10 is a cross section of the gasket affixed to the edges of the conductor support floor panels.

FIG. 8 shows a releasable latching assembly 100 in a closed position and pulling together the gasketed edges 51 of two conductor support floor pans 50 positioned on panel support struts 40. Illustrated on one of the conductor support pans 50 is an installed air duct opening cover 54 with attachment made by mechanical fastener 53. A cross-section of the gasket 120 applied to the edges 51 of the conductor support floor pans 50 is shown in FIG. 10 Using the latching assembly to mechanically draw together the gasketed edges 51 of adjacent conductor support floor panels 50 virtually eliminates air leakage into the electrical services level from the conditioned air plenum. The latching assembly 100 comprises two parts, namely, a latch 102 and a catch 104, which are shown in FIG. 9. The edges of adjacent conductor support floor panels 50 are arranged such that a latch 102 and a catch 104 are always across from one another and positioned in cooperative relation. The latches 102 and catches 104 are mechanically fastened to the conductor support floor panels 50 and the substantially vertically and horizontally extending edges of perimeter closures 56. In addition to providing a leak free fit between such panels, the latching assemblies 100 also serve to provide metal-to-metal continuity throughout the substructure of the inventive structure, thereby contributing to the remarkable electrical reference plane properties of the invention. The latching assemblies 100 also overcome the issue of dependability and sustainability of performance in this regard, which was an aspect of the inventor's prior invention due to the fact that it relied on a less satisfactory means for maintaining the necessary electrical reference continuity.

Figure 11:
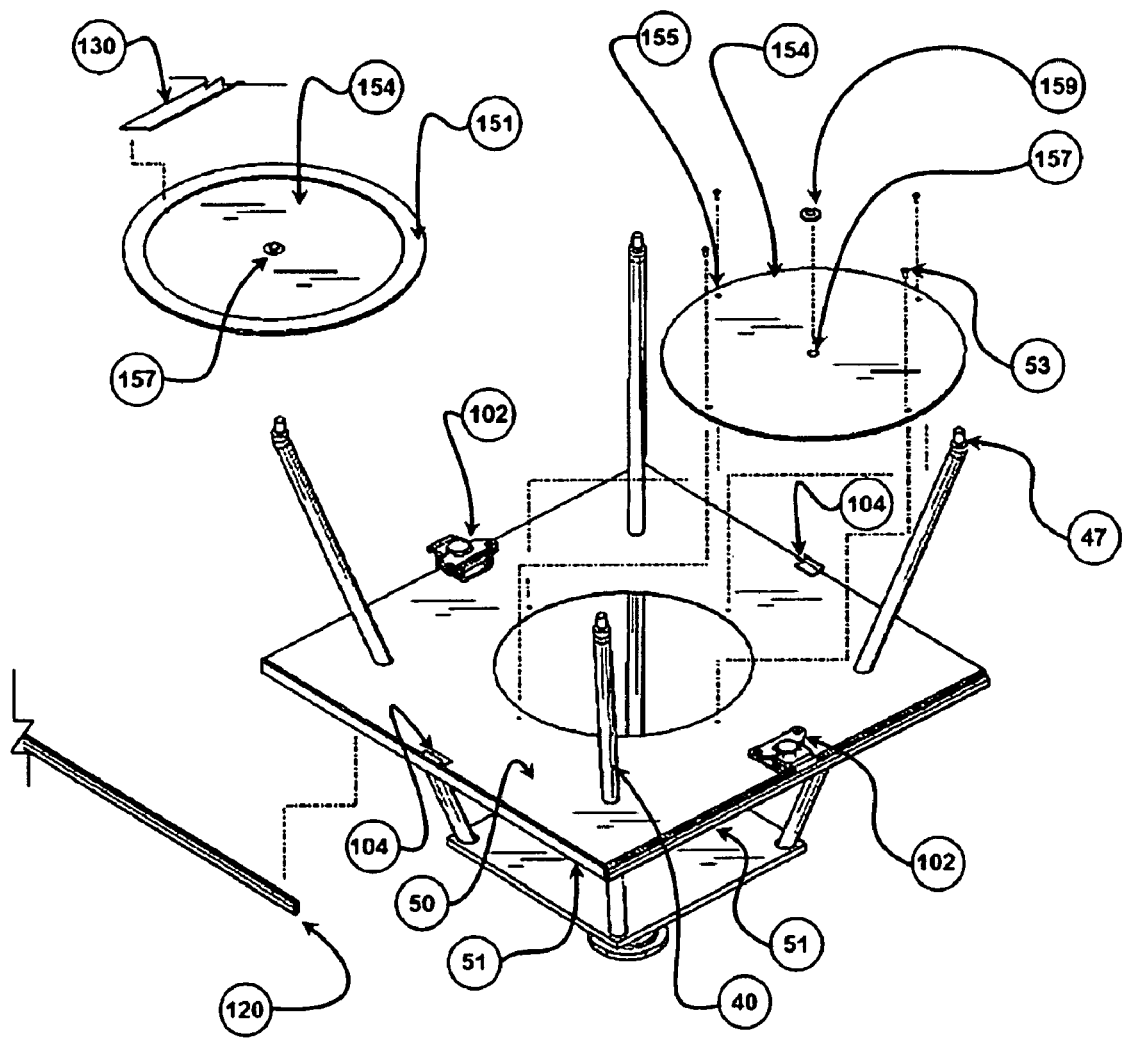
FIG. 11 is an exploded perspective view of the conductor support floor panel with an air duct opening and a removably installable air duct opening cover. The respective gaskets for conductor support floor edges and air duct opening covers are also shown, as are two latches installed on the opposite edges of the conductor support floor pan.

FIG. 11 illustrates a conductor support floor 50 with its associated air duct opening 152 and air duct opening cover 154. The figure shows that the edge 151 of the air duct opening cover 154 is provided with a gasket 130 having a different cross section from that of the gasket 120 applied to the edges 51 of conductor support floor panels 50. In this illustration of the preferred embodiment the air duct opening cover 154 is shown to be removably installable over the air duct opening 152 using mechanical fasteners 53 inserted through holes 155 in the air duct opening cover and holes 57 provided in the electrical conductor support panel 50. The air duct cover 154 is further provided with a hole 157 in its center and a removably installable plug 159 adapted to be received into hole 157 and having sufficient diameter and other characteristics such when installed it will remain in hole 157 until intentionally removed and will prevent the leakage of conditioned air from the conditioned air plenum into the electrical services level. The hole 157 is adapted to permit passage of a portion of a tool capable of engaging the hex socket 26 in the top of the adjustable threaded leveling leg and retaining stud as shown in FIG. 2. This configuration permits adjust of a module of the inventive structure to be adjusted from above, such as from the walking floor surface. FIG. 11 also depicts the lug 47 of an access floor panel positioning and retaining assembly 41 installed at the top of a panel support strut 40. In addition, FIG. 11 shows two parallel edges 51 of a conductor support floor pan 50 provided with latches 102 and each of the other two parallel edges 51 being provided with a catch 104.

Figure 13:
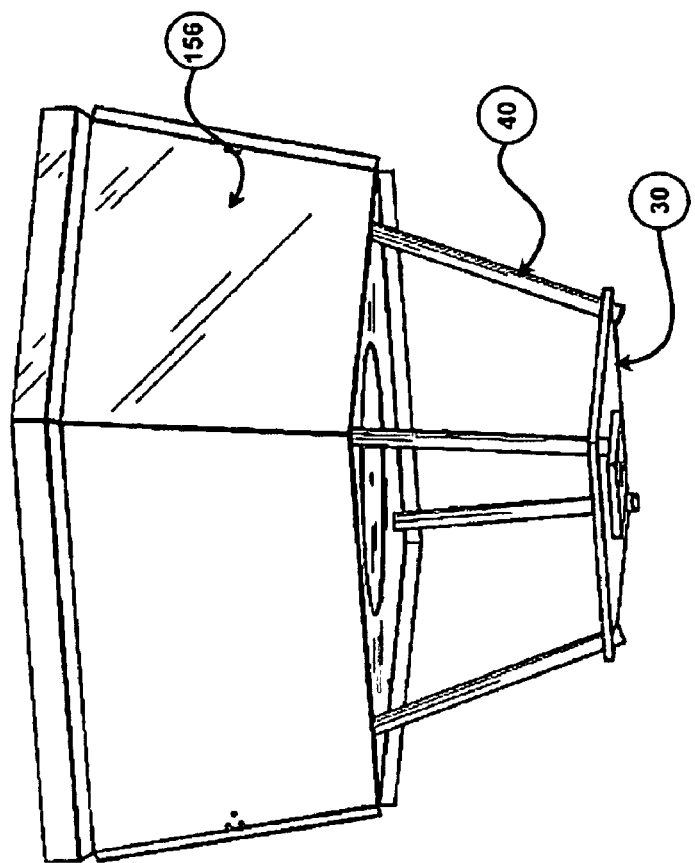
FIG. 13 is a perspective view of the exterior of the one-piece corner perimeter closure installed on the panel support assembly.
Figure 12:
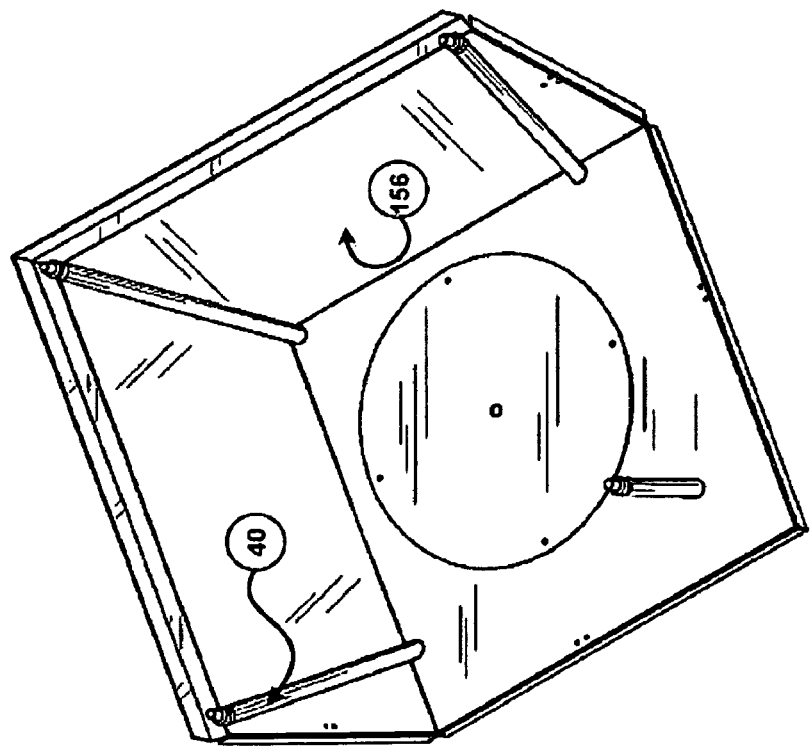
FIG. 12 is a perspective view of the interior of a one-piece corner perimeter closure installed on four panel support struts.

FIG. 12 and FIG. 13 illustrate, respectively, the interior of a unitary perimeter corner assembly 156 installed on panel support struts 40, and the exterior of the same unitary perimeter corner assembly 156, from which it can be seen that the assembly is installed on the panel support assembly comprising a strut plate 30 and four panel support struts. In addition to the significant reduction in air leakage such a configuration provides over the inventor's prior invention, the manufacture of such modular assemblies eliminates numerous installation problems in the field.

Figure 14:
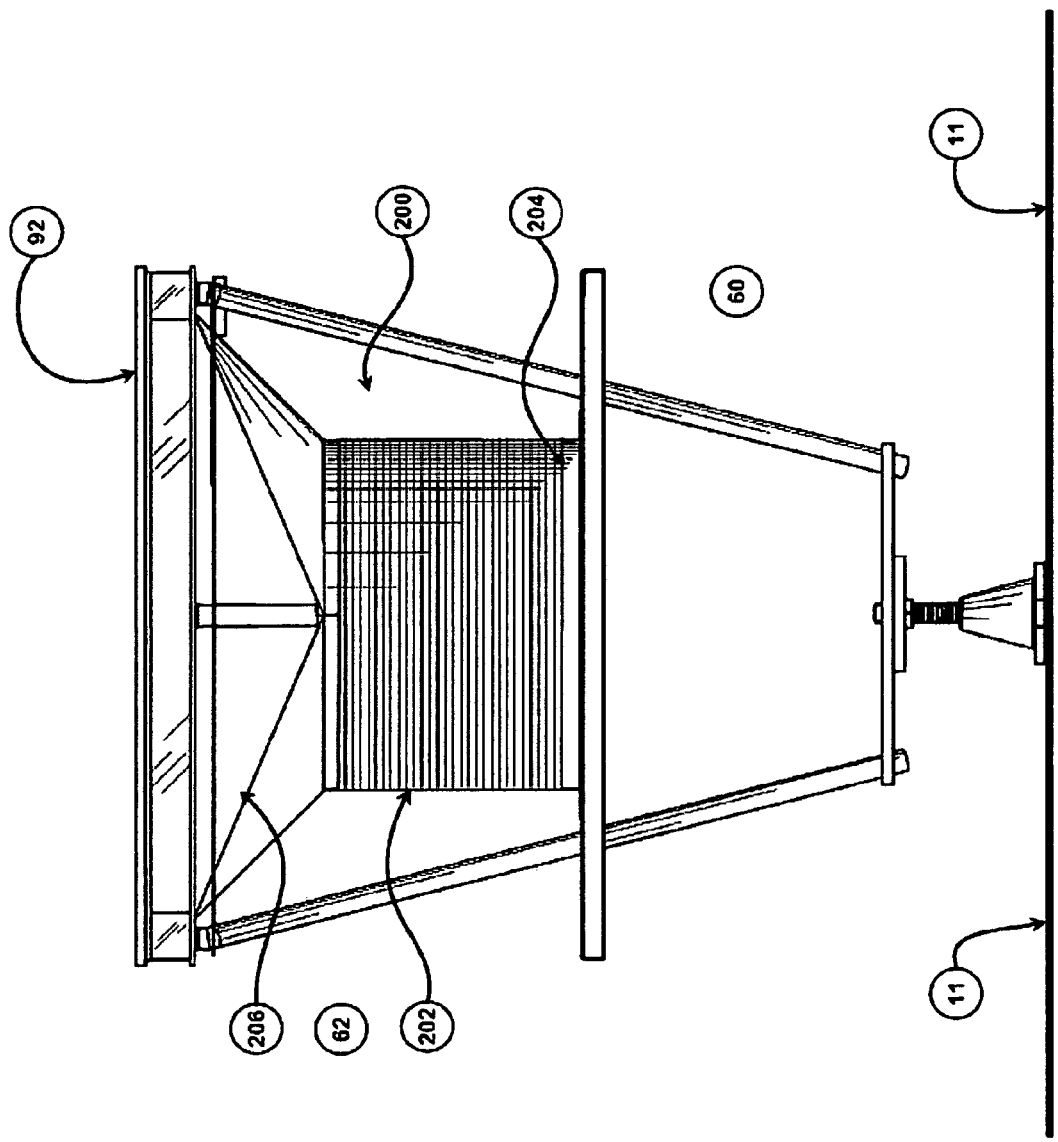
FIG. 14 is an elevation showing a module of the invention having an air duct or "air chimney" installed in it.

FIG. 14 illustrates a module of the invention supported on a building floor 11 in which an air duct or air chimney 200 has been installed to bring conditioned air from the conditioned air level 60 to the data center equipment area without discharging conditioned air into the electrical services level 62. In the preferred embodiment depicted here, the air duct 200 comprises a length of round, flex duct 202 attached at its bottom end to a collar 204 adapted to be positioned in over-lying relation to the air duct opening 152 shown in FIG. 1 and FIG. 11, the air duct cover 154 shown in the same Figs. having been removed. At its upper end, the flex duct is attached to a transition piece 206 that extends upwardly from the upper end of the of the flex duct 202 and opens outwardly, i.e., at an oblique angle to the interior passage below, so as to communicate with virtually the entire underside of a perforated panel 92. This coverage of perforations in a perforated panel 92 that contains far more perforated area than a conventional perforated area is possible because of the inventive system's remarkable ventilation effectiveness. In contrast to conventional access floor systems, with the inventive system it is completely unnecessary to consider air leakage when sizing the air distribution openings of perforated panels.

Improved Modular Multilevel Raised Floor Electro-Mechanical Distribution System

Preferred embodiments of the invention have been set forth by way of example and not of limitation. It is anticipated that certain variations and changes may be made to the descried structure without departing from the spirit of the invent or the scope of the appended claims.

The invention claimed is:
1. A multiple component, multilevel floor construction for distribution of conditioned air to equipment on an access floor supported over a base floor, said multilevel floor construction comprising:
  a modular array of unitary modules, each module including an assembly of support struts, each strut of each module extending upwardly from a base floor support element to a top access floor panel support end, each module further including an intermediate conductor support floor panel supported by and substantially sealed to the assembly of struts intermediate the base support element and the top access panel support end of the assembly of struts, selected intermediate conductor support floor panels including a substantially centrally located through passage;
  access floor panels seated respectively on said top panel support ends of selected modules to form said access floor,
  whereby said modules and access floor panels form said access floor and an intermediate conductor support floor spaced from and beneath the access floor by said struts, said intermediate conductor support floor positioned above said base floor by said struts, said access floor and said intermediate conductor support floor having a substantially coextensive perimeter;
  perimeter closure members extending intermediate the access floor and the conductor support floor along at least a portion of the access floor and conductor floor perimeters whereby a conditioned air plenum is formed between the conductor support floor and the base floor generally sealingly separated from a service space between the access floor and the conductor support floor; and
  an air duct extending from a through passage of said conductor support floor panel to the access floor whereby conditioned air from said plenum is directed by said duct without dispersion into said service space;
  said access floor panels and intermediate conductor support floor panels of selected modules being substantially equally sized and aligned coextensively by said struts, and wherein said struts extend upwardly from said base support through said intermediate conductor support floor panels for connection to a corner of a said access floor panel by the top panel support ends;

a locking mechanism located on the periphery of selected intermediate conductor support floor panels for retaining selected said conductor intermediate support floor panels joined together;

a locking element for connecting at least one of the top panel support ends of said struts of said selected modules;

wherein said locking element supports selected access floor panels of selected adjacent modules and;

wherein said support struts of a said module extend from said foot obliquely at an angle from a center axis of said module.

2. The floor construction of claim 1 wherein said base floor support element of at least one of said modules comprises a support foot including a height adjustment mechanism.

3. The floor construction of claim 2 wherein the support foot height adjustment mechanism includes an adjustment element accessible from an upper end of said support foot.

4. The construction of claim 1 wherein said plenum includes a perimeter conditioned air trough formed by said perimeter closure members for receipt of conditioned air from an external source.

5. The floor construction of claim 1 wherein said intermediate conductor support floor panels includea seal along at least a portion of the perimeter of said conductor support floor panels.

6. The floor construction of claim 1 wherein the struts for a selected said intermediate conductor support panel are fixed to a selected said intermediate conductor support floor panel.

7. The floor construction of claim 1 wherein at least one selected intermediate conductor support floor panel locking mechanism is located along an edge of said one selected intermediate conductor support floor panel.

8. The floor construction of claim 1 wherein at least one of said struts includes an access panel connecting lug on the top end for connection to an access floor panel.

9. The floor construction of claim 8 including at least one opening with a removable cover in at least one said intermediate conductor support floor panel to connect to said through passage of said one intermediate conductor support floor panel upon removal of said cover.

* * * * *